United States Patent
Garg et al.

(10) Patent No.: US 9,274,602 B2
(45) Date of Patent: Mar. 1, 2016

(54) HAPTIC ACTUATOR CONTROLLER

(71) Applicant: TEXAS INSTRUMENTS INCORPORATED, Dallas, TX (US)

(72) Inventors: Mayank Garg, Richardson, TX (US); David Hernandez, Dallas, TX (US); Brandon Beckham, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 626 days.

(21) Appl. No.: 13/663,907

(22) Filed: Oct. 30, 2012

(65) Prior Publication Data

US 2014/0118126 A1 May 1, 2014

(51) Int. Cl.
*H02P 1/00* (2006.01)
*H02P 6/08* (2006.01)
*G06F 3/01* (2006.01)

(52) U.S. Cl.
CPC ....................................... *G06F 3/016* (2013.01)

(58) Field of Classification Search
CPC .......... H02P 2007/0083; H02P 25/028; H02P 6/147; H02P 6/18
See application file for complete search history.

(56) References Cited

U.S. PATENT DOCUMENTS

| 8,272,592 | B2 * | 9/2012 | Badre-Alam et al. ..... 244/17.13 |
| 2007/0007072 | A1 * | 1/2007 | Ta et al. ......................... 180/446 |
| 2011/0102162 | A1 * | 5/2011 | Gregorio et al. ............ 340/407.2 |
| 2012/0188180 | A1 * | 7/2012 | Yang et al. .................... 345/173 |

\* cited by examiner

*Primary Examiner* — Eduardo Colon Santana
*Assistant Examiner* — Bickey Dhakal
(74) *Attorney, Agent, or Firm* — Gregory J. Albin; Frank D. Cimino

(57) ABSTRACT

An apparatus and method for controlling a haptic actuator. A haptic actuator controller can includes driver input amplifier, an actuator feedback amplifier, an actuator driver, and a gain controller. The actuator driver is configured to drive a haptic actuator based on a difference of output of the input amplifier and output of the actuator feedback amplifier. The gain controller is configured to determine a boost interval for initiating motion of the haptic actuator, the boost interval based on a boost threshold back-electromotive-force (BEMF) voltage value exceeding a BEMF voltage generated by the haptic actuator. The gain controller is also configured to apply boost gains in the input amplifier and the feedback amplifier during the boost interval. The boost gains are higher than gains applied subsequent to the boost interval to maintain motion of the haptic actuator.

18 Claims, 3 Drawing Sheets

HAPTIC ACTUATOR CONTROLLER

BACKGROUND

To improve operability, many electronic devices employ haptics or haptic feedback. Haptics provide information to the user of a device via the user's sense of touch. Accordingly, haptics may employ various stimuli that are sensed via touch, such as vibration, pressure, temperature, etc. Vibration (e.g., periodic motion) is commonly used to provide haptic feedback. For example, a device may momentarily vibrate when a user touches a control area of a touchscreen or when an alarm condition is triggered.

Linear resonant actuators (LRA) and eccentric rotating mass (ERM) actuators are two types haptic actuators employed to provide vibratory feedback. An ERM actuator includes an electric motor (e.g., a brushed DC motor) with an eccentric (off center) mass attached to the rotor shaft. When activated the ERM actuator produces a two-dimensional vibratory effect. An LRA includes a mass attached to a spring, and a coil proximate to the mass. Energizing the coil causes linear movement of the mass producing vibration in one dimension. Haptic systems employ driver or control circuitry coupled to a haptic actuator to induce motion in the haptic actuator.

SUMMARY

An apparatus and method for controlling operation of a haptic actuator is disclosed herein. In one embodiment, a haptic actuator controller includes a driver input amplifier, an actuator feedback amplifier, an actuator driver, and a gain controller. The actuator driver is configured to drive a haptic actuator based on a difference of output of the input amplifier and output of the actuator feedback amplifier. The gain controller is configured to determine a boost interval for initiating motion of the haptic actuator, the boost interval based on a boost threshold back-electromotive-force (BEMF) voltage value exceeding a BEMF voltage generated by the haptic actuator. The gain controller is also configured to apply boost gains in the input amplifier and the feedback amplifier during the boost interval. The boost gains are higher than gains applied subsequent to the boost interval to maintain motion of the haptic actuator.

In another embodiment, a method for driving a haptic actuator includes identifying a boost interval, in which a back-electromotive-force (BEMF) voltage generated by the haptic actuator is less than a boost threshold BEMF voltage value, for initiating motion of the haptic actuator. An input boost gain is applied to a driver input signal and a feedback boost gain is applied to the BEMF voltage generated by the haptic actuator during the boost interval. A reduced input gain is applied to the driver input signal and a reduced feedback gain is applied to the BEMF voltage generated by the haptic actuator at termination of the boost interval. The input boost gain exceeds the reduced input gain and the feedback boost gain exceeds the reduced feedback gain.

In a further embodiment, a tactile feedback system includes an actuator controller configured to control motion of a haptic actuator. The actuator controller includes an input amplifier, a feedback amplifier, an actuator driver, and an amplifier gain controller. The amplifier gain controller is coupled to, and configured to control gain of, the input amplifier and the feedback amplifier. The gain controller is further configured to determine an end-of-braking interval for halting motion of the haptic actuator. The end-of-braking interval is based on an end-of-braking threshold back-electromotive-force (BEMF) voltage value exceeding a BEMF voltage generated by the haptic actuator. The gain controller is further configured to apply end-of-braking gains in the input amplifier and the feedback amplifier during the end-of-braking interval. The end-of-braking gains are lower than gains applied in the input amplifier and the feedback amplifier prior to the end-of-braking interval.

BRIEF DESCRIPTION OF THE DRAWINGS

For a detailed description of exemplary embodiments of the invention, reference will now be made to the accompanying drawings in which.

DETAILED DESCRIPTION

Figure 1:
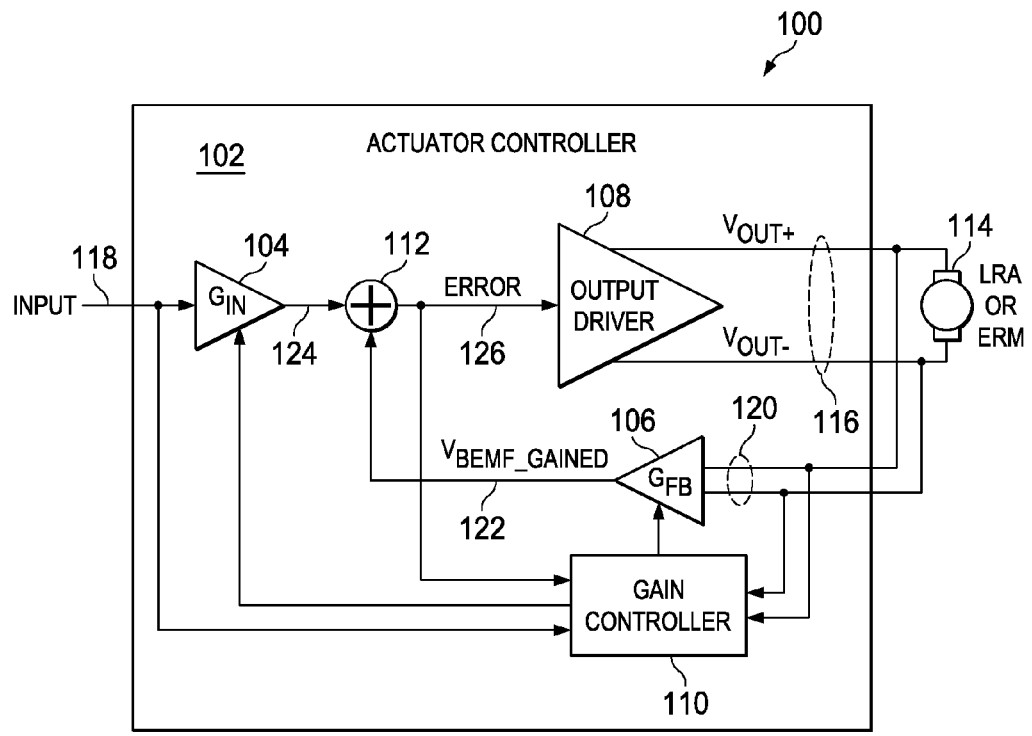
FIG. 1 shows a block diagram of an example of a tactile feedback system.

Controllers for driving haptic actuators, such as linear resonant actuators (LRA) and eccentric rotating mass (ERM) actuators, may be implemented in open or closed loop configurations. In a closed-loop configuration, the speed of the haptic system is determined by the parameters of the haptic actuator, as well as by gains of the control loop, such as the gain applied to a feedback signal from the haptic actuator. The closed loop rotational speed response of an ERM may be approximated as:

$$\frac{\Omega(s)}{\text{INPUT}(s)} = \frac{G_{IN} K_t}{R \cdot J} \frac{1}{s + \left[\frac{B}{J} + \frac{G_{FB} \cdot K_t \cdot K_m}{R \cdot J}\right]} \quad (1)$$

where:
$\Omega$ is the angular frequency or rotating speed in radians per second;
$K_t$ is the torque constant;
$K_m$ is the back electromotive force constant;
J is the inertia;
R is the coil resistance;
$G_{IN}$ is input gain; and
$G_{FB}$ is feedback gain.

The transient response of the ERM system is given by:

$$\omega(t) = \frac{G_{IN} K_t}{R \cdot J + G_{FB} \cdot K_t \cdot K_m} \left[1 - e^{-\left[\frac{B}{J} + \frac{G_{FB} \cdot K_t \cdot K_m}{R \cdot J}\right]t}\right] \text{Input}(t) \quad (2)$$

where:
$\omega$ is the angular frequency or rotating speed in radians per second;
$K_t$ is the torque constant;
$K_m$ is the back electomotive force constant;

J is the inertia;

R is the coil resistance;

$G_{IN}$ is input gain; and $G_{FB}$ is feedback gain.

As indicated by equation (2) above, transient response of the ERM system may be improved by increasing the feedback gain. Closed loop systems employing an LRA exhibit a similar transient response feedback gain relationship.

While increasing gain can improve settling time, increasing gain can also lead to system instability. For example, higher feedback gains can improve braking (i.e., halting actuator motion), but can also cause large perturbations in force or torque applied to the actuator, especially when the actuator is nearly stopped. Considering an LRA system, if the mass displacement amplitude is small, and magnetic force is high due to large feedback gain, the actuator may reverse direction and mass displacement may increase rather than decreasing. Furthermore, in cases where the haptic controller needs to lock to the resonance frequency of the mechanical system (e.g., an LRA system), the controller may lose lock because the excessive force applied to the mass alters the period of the back-electromotive-force (BEMF) voltage. BEMF voltage is the voltage generated by an ERM motor as it operates (e.g., spins), or by an LRA as it moves through the coil's magnetic field.

Because the interval over which haptics is active may be short, it is advantageous to bring the haptic actuator to a desired output level in as short a duration as possible. Examples of the haptic actuator controller disclosed herein decrease the startup time of the haptic actuator by applying boost gains during a startup interval. The boost gains may be applied until actuator output exceeds a predetermined level during actuator startup. The examples also provide fast settling and stable operation when the actuator is being halted (during braking) by applying reduced gains (end-of-braking gains) during an end-of-braking interval. The end-of-braking gains may be applied when actuator output falls below a predetermined level during braking. Thus, the examples can partition operation of the haptic actuator into distinct intervals including, a boost interval for fast actuator start-up and an end-of braking interval for stable actuator braking. Boost gains are applied during the boost interval. The boost gains are higher than the gains applied subsequent to the boost interval. End-of-braking gains are applied during the end-of-braking interval. The end-of-braking gains are lower than gains applied prior to the end-of braking interval.

FIG. 1 shows a block diagram of an example of a tactile feedback system 100. The system 100 includes a haptic actuator 114 and an actuator controller 102. The haptic actuator 114 may include an LRA or an ERM. The actuator controller 102 is coupled to the haptic actuator 114 and provides drive signals 116 that control the motion of the haptic actuator 114. The actuator controller 102 includes a driver input amplifier 104, an actuator feedback amplifier 106, an actuator driver 108, and a gain controller 110. The input amplifier 104 applies gain to an input signal 118 received by the actuator controller 102. The input signal 118 is asserted to control the provision of tactile feedback via the haptic actuator 114.

The feedback amplifier 106 applies gain to the BEMF voltage signal 120 fed back to the controller 102 from the haptic actuator 114. The amplified output 122 of the feedback amplifier 106 is combined with the amplified output 124 of the input amplifier 104 in a summing junction 112. The difference of the amplified outputs 122 and 124 produced in the summing junction 112 (ERROR signal 126) is provided to the output driver 108 to drive the haptic actuator 114.

The gain controller 110 monitors the input signal 118, the feedback signal 120, and the ERROR signal 126 and sets the gains of the input amplifier 104 and the feedback amplifier 106 based on the amplitudes of the input signal 118, feedback signal 120, and ERROR signal 126, and the state of the actuator drive sequence. The gain controller 110 sets the gains of the input amplifier 104 and the feedback amplifier 106, and thereby provides drive to the haptic actuator 114, in distinct intervals.

The gain controller 110 initiates motion of the haptic actuator 114 in a boost interval. During the boost interval the gain controller 110 applies boost gains in the input amplifier 104 and the feedback amplifier 106. The boost gains are relatively high gains, that when applied, rapidly increase the motion of the haptic actuator 114. The gain controller can apply the relatively high boost gains during the boost interval because the drive signals 116 generated by the output driver 108 are clamped to a maximum voltage in accordance with the maximum drive voltage of the haptic actuator 114.

The gain controller 110 may define the boost interval (Boost) based on the BEMF signal 120 and the input signal 118 as:

$$\text{Boost} = |BEMF| < (K_{THRESH\_BOOST} * \text{INPUT} * |BEMF_{FULLSCALE}|) \text{ and ERROR} > 0 \quad (3)$$

where:

$K_{THRESH\_BOOST}$ is a boost threshold scaling factor that is a positive value and less than one; INPUT is amplitude of input signal 118 normalized to a full scale of one;

$BEMF_{FULLSCALE}$ is the BEMF voltage value generated by the haptic actuator 114 responsive to a full-scale actuator drive signal 116;

INPUT*$|BEMF_{FULLSCALE}|$ represents the target BEMF magnitude for the corresponding input signal 118;

$K_{THRESH\_BOOST}$*INPUT*$|BEMF_{FULLSCALE}|$ defines a boost threshold BEMF voltage value applied to define the boost interval; and ERROR>0 (i.e., ERROR signal 126>0) defines the boost interval as being only while driving the actuator, not while braking.

The boost gains applied in the input amplifier 106 and the feedback amplifier 106 by the gain controller 110 during the boost interval may be defined as:

$$GIN_{SYSTEM} = K_{BOOST} * GIN_{STORED} \quad (4)$$

$$GFB_{SYSTEM} = K_{BOOST} * GFB_{STORED} \quad (5)$$

where:

$GIN_{SYSTEM}$ is the gain applied in the input amplifier 104;

$GFB_{SYSTEM}$ is the gain applied in the feedback amplifier 106;

$GIN_{STORED}$ is a predetermined input amplifier reference gain value;

$GFB_{STORED}$ is a predetermined feedback amplifier reference gain value; and $K_{BOOST}$ is a predetermined boost scaling value applied to the reference gains to generate the boost gains. $K_{BOOST}$ is greater than one.

Thus, with $K_{THRESH\_BOOST}$*INPUT*$|BEMF_{FULLSCALE}|$, and $K_{THRESH\_BOOST}=0.7$, for example, the gain controller 110 will boost the loop gain (gain applied in the input amplifier 104 and the feedback amplifier 106) by a factor of $K_{BOOST}$ if the haptic actuator 114 has not reached 70% of its target BEMF magnitude.

At the end of the boost interval, the gain controller 110 reduces the gains applied in the input amplifier 104 and the feedback amplifier 106, relative to the boost gains, to maintain motion of the haptic actuator 114. The gain controller 110 may apply the reduced gains based on:

$$!(|BEMF|<(K_{THRESH\_BOOST}*INPUT*|BEMF_{FULLSCALE}|) \text{ and } ERROR>0) \quad (6)$$

The reduced gains applied in the input amplifier 106 and the feedback amplifier 106 by the gain controller 110 subsequent to the boost interval may be defined as:

$$GIN_{SYSTEM}=GIN_{STORED} \quad (7)$$

$$GFB_{SYSTEM}=GFB_{STORED} \quad (8)$$

where the gain controller 110 applies the predetermined reference gain values as the reduced gain values.

Figure 2:
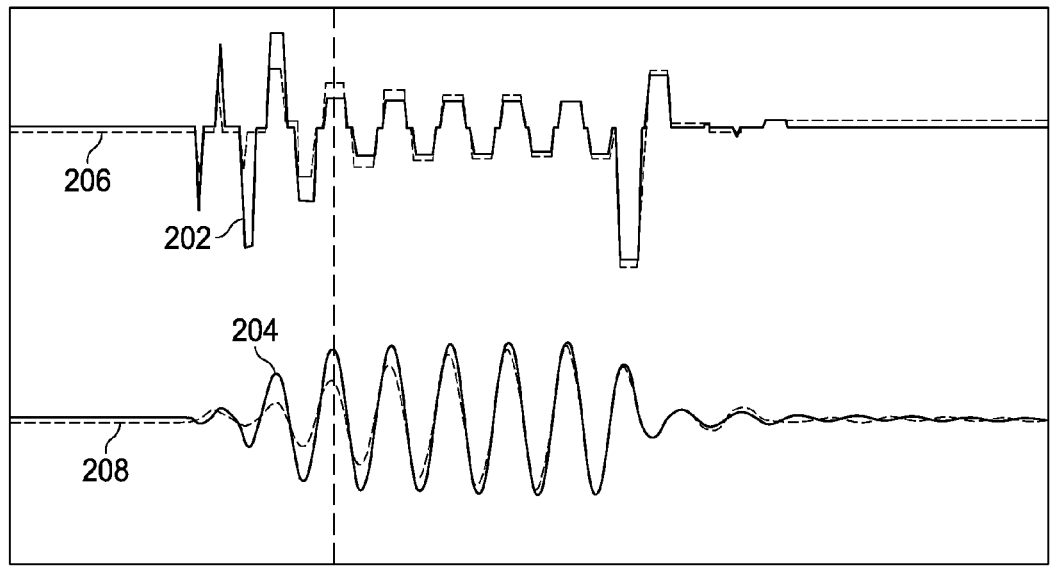
FIG. 2 shows an example of a boost gain applied to an actuator drive signal generated by an actuator controller and corresponding haptic actuator motion.

FIG. 2 shows example boost gains applied in the actuator controller 102 and corresponding motion in the haptic actuator 114. The signals of FIG. 2 may be applicable to an LRA for example. The drive signal 202 is generated by the actuator controller 102 and produces motion in the haptic actuator 114 represented by the signal 204. The application of the boost gains is reflected in the increased amplitude of the drive signal 202 at the initiation of motion of the actuator 114. As shown by signal 204, the amplitude of actuator motion increases rapidly to a desired level responsive to the boost gains. As the desired amplitude of actuator motion is approached, the gain controller 110 applies the reduced gains as shown by the sudden reduction in amplitude of the drive signal 202. In contrast, in an actuator controller not employing the boost interval described herein, the actuator drive signal 206 reflects a lower initial drive that slowly decreases to a reduced drive level thereby reducing the rate at which the actuator output 208 achieves a desired amplitude. Thus, the application of boost gains during the defined boost interval and subsequent application of reduced gains based on the amplitude of actuator motion approaching a desired level advantageously reduces actuator response time.

The gain controller 110 can also provide stabilization during braking of motion of the haptic actuator 114. The gain controller 110 halts motion of the haptic actuator 114 in an end-of-braking interval. During the end-of-braking interval the gain controller 110 applies end-of-braking gains in the input amplifier 104 and the feedback amplifier 106. The end-of-braking gains are relatively low gains, that when applied, increase the stability of the control loop, including the input amplifier 104 and feedback amplifier 106, driving the haptic actuator 114. The gain controller 110 may define the end-of-braking interval (EOB) based on the BEMF signal 120 as:

$$EOB=|BEMF|<(K_{THRESH\_EOB}*|BEMF_{FULLSCALE}|) \text{ and } ERROR<0 \quad (9)$$

where:

$K_{THRESH\_EOB}$ is an end-of-braking threshold scaling factor that is a positive value that is less than one;

$BEMF_{FULLSCALE}$ is the BEMF voltage value generated by the haptic actuator 114 responsive to a full-scale actuator drive signal 116;

$K_{THRESH\_EOB}*|BEMF_{FULLSCALE}|$ defines an end-of-braking threshold BEMF voltage value used to define the end-of-braking interval; and ERROR<0 (i.e., ERROR signal 126<0) defines the end-of-braking interval as being only while bringing the haptic actuator 114 to a halt (i.e., while braking).

Application of the end-of-braking gains in the input amplifier 104 and the feedback amplifier 106 by the gain controller 110 during the end-of-braking interval may be defined as:

$$GIN_{SYSTEM}=GIN_{EOB} \quad (10)$$

$$GFB_{SYSTEM}=GFB_{EOB} \quad (11)$$

where:

$GIN_{EOB}$ and $GFB_{EOB}$ are predetermined end-of-braking gain values that provide control loop stability when the BEMF has reached a desired end-of-braking threshold. $GIN_{EOB}$ and $GFB_{EOB}$ are lower gain values than the gain values applied in the input amplifier 104 and feedback amplifier 106 prior to the end-of-braking interval.

Thus, with $K_{THRESH\_EOB}*|BEMF_{FULLSCALE}|$, and $K_{THRESH\_EOB}=0.1$, for example, the gain controller 110 will reduce the loop gain (gain applied in the input amplifier 104 and the feedback amplifier 106) by applying the end-of-braking gains if the output amplitude of the haptic actuator 114 has reached 10% or less of full-scale BEMF magnitude (i.e., BEMF amplitude at full-scale actuator drive).

Figure 3:
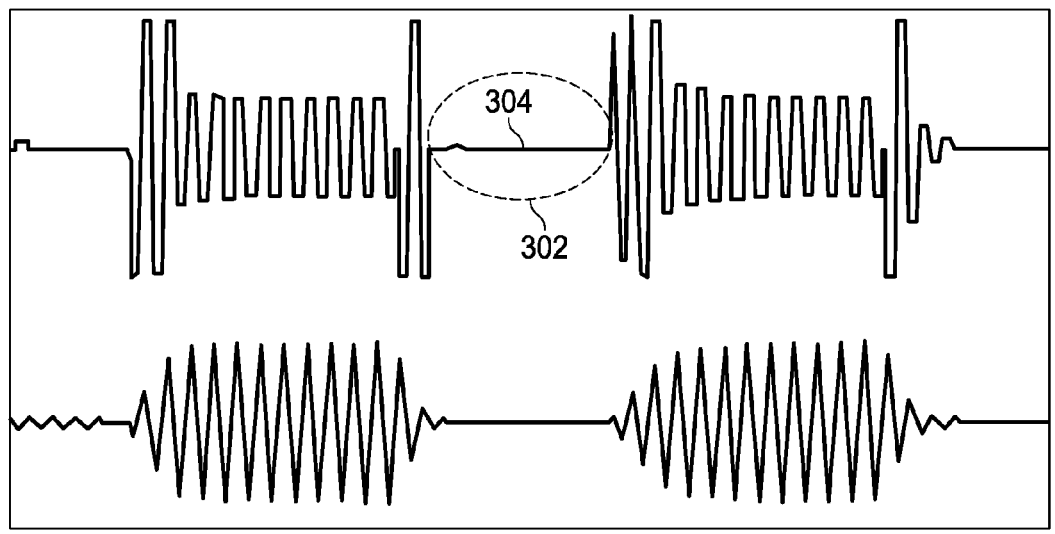
FIG. 3 shows an example of an end-of-braking gain applied to an actuator drive signal generated by an actuator controller and corresponding haptic actuator motion.
Figure 4:
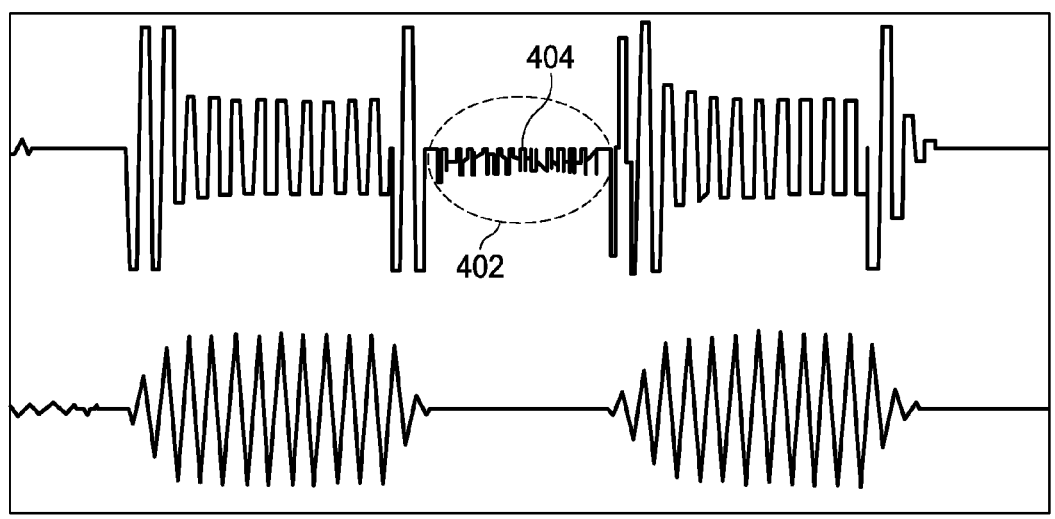
FIG. 4 shows an example of an oscillation of an actuator drive signal generated by an actuator controller lacking application end-of-braking gain.

FIG. 3 shows an example of end-of-braking gains applied to an actuator drive signal 116 generated by an actuator controller 102 and corresponding haptic actuator motion. The signals of FIG. 3 may be applicable to an LRA for example. As shown in FIG. 3 the output drive signal 304 is stable during the interval 302 responsive to the application of the end-of-braking gains by the gain controller 110. FIG. 3 also shows that prior to the end-of-braking interval, the gain controller 110 may increase the gains applied the actuator drive signal 116 to accelerate braking. In contrast to FIG. 3, FIG. 4 shows oscillations of the unstable drive signal 404 generated by an actuator controller that maintains, during the interval 402, gains higher than the end-of-braking gains applied by the actuator controller 102 during the interval 302.

Figure 5:
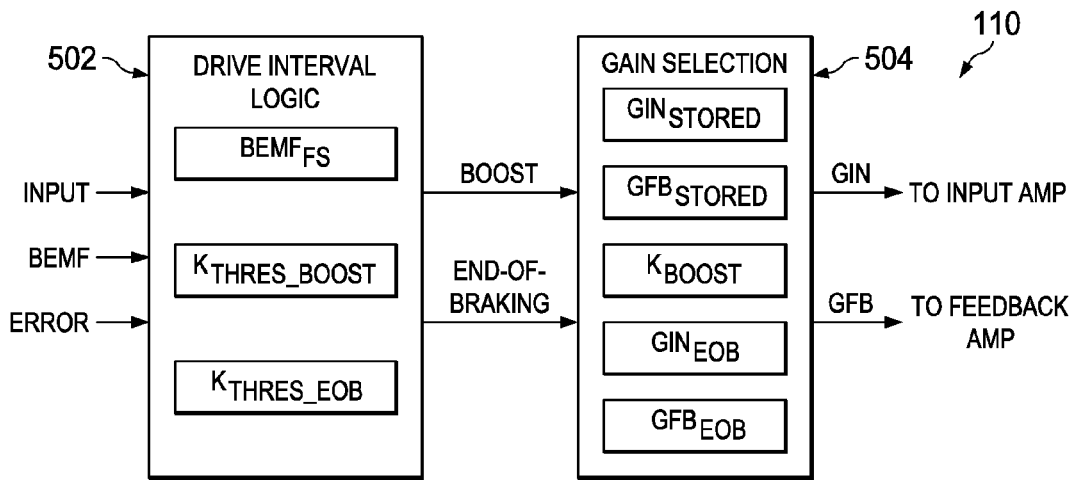
FIG. 5 shows a block diagram of an example of a gain controller that selects gains for application in an actuator controller.

FIG. 5 shows a block diagram of an example of the gain controller 110. The gain controller 110 includes drive interval determination logic 502 and gain selection logic 504. The drive interval determination logic 502 determines whether drive to the haptic actuator 114 is being provided in a boost interval, an end-of-braking interval, or other drive interval as described herein. The drive interval determination logic 502 may identify the drive interval based on expressions (3), (6), and/or (9) as disclosed herein.

Information regarding the current drive interval is provided to the gain selection logic 504 by the drive interval selection logic 502. The gain selection logic 504 generates and/or selects gain values for application in the input amplifier 104 and the feedback amplifier 106 in accordance with the current drive interval. The gain selection logic 504 may generate and/or select the gains in accordance with expressions (4), (5), (7), (8), (10), and/or (11) disclosed herein.

Various components of the actuator controller 102 may be implemented as analog circuits. For example, the input amplifier 104, feedback amplifier, and/or gain controller may 110 may be implemented as analog circuits that apply gain to or otherwise process analog versions of the input signal 118 and/or the feedback signal 120. Alternatively components of the actuator controller 102 may be implemented as digital circuits. For example, the input amplifier 104, feedback amplifier, and/or gain controller 110 may be implemented as digital circuits that digitally apply gain to or otherwise process digital representations of the input signal 118 and/or the feedback signal 120. Additionally, the actuator controller 102 may include various components that have been omitted from FIG. 1 in the interest of clarity. For example, the actuator controller 102 may include analog-to-digital converters, digital signal processing circuitry, gain value storage, and/or analog comparators, etc.

Figure 6:
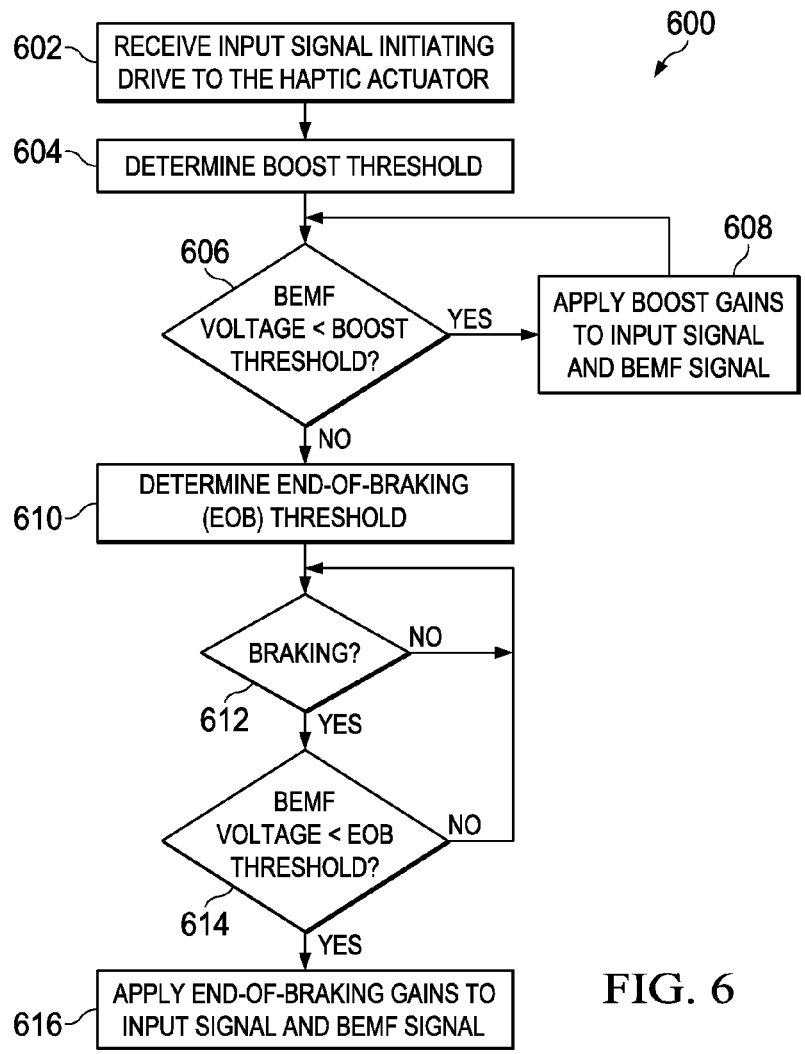
FIG. 6 shows a flow diagram for an example method for driving a haptic actuator.

FIG. 6 shows an example flow diagram for a method 600 for driving a haptic actuator 114. Though depicted sequentially as a matter of convenience, at least some of the actions shown can be performed in a different order and/or performed in parallel.

In block 602, the haptic actuator 114 is in a resting state (i.e., not in motion). The actuator controller 102 receives the input signal 118 indicating that motion of the haptic actuator 114 is to be initiated. For example, if the haptic actuator 114 is an ERM, then the signal 118 may transition from zero volts to a positive voltage to initiate motion of the ERM.

In block 604, the gain controller 104 determines a boost threshold BEMF voltage value to be used to define the boost interval, during which boost gains are to be applied in the input amplifier 104 and the feedback amplifier 106. The boost threshold BEMF value may also be determined as described herein as:

$$K_{THRESH\_BOOST} * INPUT * |BEMF_{FULLSCALE}|$$

based on the response of the haptic actuator 114 to a full-scale drive signal (i.e., BEMF voltage generated by the actuator 114 responsive to the full-scale drive signal), amplitude of input signal 118, and a boost threshold scaling factor.

In block 606, the actuator controller 102 is driving the haptic actuator 114 to initiate motion therein. The actuator controller 102 compares the BEMF voltage 120 generated by the haptic actuator 114 to the boost threshold BEMF voltage value to identify a boost interval during which boost gains are to be applied. The actuator controller 102 may define the boost interval as a period during which the boost threshold BEMF voltage value exceeds the BEMF voltage generated by the haptic actuator 114. During the boost interval, the actuator controller 102 applies an input boost gain to the input signal 118 via the input amplifier 104, and a feedback boost gain to the BEMF feedback voltage signal 120 via the feedback amplifier 106. The boost interval based on the ERROR signal 126 may also be greater than zero.

If the boost threshold BEMF voltage value does not exceed the BEMF voltage generated by the haptic actuator 114 when initiating motion of the haptic actuator 114, then, the actuator controller 102 may reduce, relative to the boost gains, the gains applied in the input amplifier 104 and the feedback amplifier 106.

In block 610, the actuator controller 102 determines an end-of-braking threshold BEMF voltage value to be used to define an end-of-braking interval. The end-of-braking threshold BEMF value may also be predetermined based on the response of the haptic actuator 114 to a full-scale drive signal (i.e., BEMF voltage generated by the actuator 114 responsive to the full-scale drive signal). During the end-of-braking interval, end-of-braking gains are applied in the input amplifier 104 and the feedback amplifier 106.

In block 612, the actuator controller 102 determines whether braking is being applied to the haptic actuator 114. The actuator controller may determine that braking is being applied by the haptic actuator 114 based on the ERROR signal 126. If the ERROR signal 126 is less than zero, then braking is being applied.

If braking is being applied to the haptic actuator 114, then in block 614 the actuator controller 102 determines whether the BEMF voltage generated by the haptic actuator 114 is less than the end-of-braking threshold BEMF voltage value. If the BEMF voltage generated by the haptic actuator 114 is not less than the end-of-braking threshold BEMF voltage value then end-of-braking gains are not applied by the actuator controller 102.

If the BEMF voltage generated by the haptic actuator 114 is less than the end-of-braking threshold BEMF voltage value then, in block 616, the actuator controller applies end-of-braking gain to the input signal 118 via the input amplifier 104, and to the BEMF feedback voltage signal 120 via the feedback amplifier 106.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A haptic actuator controller, comprising:
   a driver input amplifier;
   an actuator feedback amplifier;
   an actuator driver configured to drive a haptic actuator based on a difference of an output of the input amplifier and an output of the actuator feedback amplifier; and
   a gain controller configured to:
      determine a boost interval for initiating motion of the haptic actuator, the boost interval based on a boost threshold back-electromotive-force (BEMF) voltage value exceeding a BEMF voltage generated by the haptic actuator; and
      apply boost gains in the input amplifier and the feedback amplifier during the boost interval, wherein the boost gains are higher than gains applied subsequent to the boost interval to maintain motion of the haptic actuator,
      wherein the boost threshold BEMF voltage value is a product of:
         an input voltage value provided to the driver input amplifier.
         a BEMF voltage value generated by the haptic actuator based on a full-scale actuator drive voltage; and
         a boost threshold scaling factor.

2. The actuator controller of claim 1, wherein the gain controller is configured to apply, subsequent to the boost interval, gains lower than the boost gains in the input amplifier and the feedback amplifier based on the boost threshold BEMF voltage value not exceeding the BEMF voltage generated by the haptic actuator.

3. The actuator controller of claim 1, wherein: the boost threshold scaling factor is a positive value less than one; and the boost gains are products of the gains applied subsequent to the boost interval and a boost factor that is greater than one.

4. The actuator controller of claim 1, wherein the gain controller is configured to:
   determine an end-of-braking interval for halting motion of the haptic actuator, the end-of-braking interval based on an end-of-braking threshold BEMF voltage value exceeding a BEMF voltage generated by the haptic actuator; and
   apply end-of-braking gains in the input amplifier and the feedback amplifier during the end-of-braking interval, wherein the end-of-braking gains are lower than the gains applied prior to the end-of-braking interval.

5. The actuator controller of claim 4, wherein the end-of-braking threshold BEMF voltage value is a product of:
   a BEMF voltage value generated by the haptic actuator based on a full-scale actuator drive voltage; and
   an end-of-braking threshold scaling factor.

6. The actuator controller of claim 5, wherein the end-of-braking threshold scaling factor is a positive value less than one.

7. A method for driving a haptic actuator, comprising:
   identifying a boost interval, in which a back-electromotive-force (BEMF) voltage generated by the haptic actuator is less than a boost threshold BEMF voltage value, for initiating motion of the haptic actuator;

applying an input boost gain to a driver input signal and a feedback boost gain to the BEMF voltage generated by the haptic actuator during the boost interval;

applying a reduced input gain to the driver input signal and a reduced feedback gain to the BEMF voltage generated by the haptic actuator at termination of the boost interval;

wherein the input boost gain exceeds the reduced input gain and the feedback boost gain exceeds the reduced feedback gain, wherein:

the input boost gain is a product of the reduced input gain and a predetermined boost constant;

the feedback boost gain is a product of the reduced feedback gain and the predetermined boost constant; and the predetermined boost constant is greater than one.

8. The method of claim 7, further comprising computing the boost threshold BEMF voltage value as a product of:

an input voltage value provided to the driver input amplifier, a BEMF voltage value generated by the haptic actuator based on a full-scale actuator drive voltage; and a boost threshold scaling factor.

9. The method of claim 7, further comprising:

identifying an end-of-braking interval, wherein an end-of-braking threshold BEMF voltage value exceeds a BEMF voltage generated by the haptic actuator, for halting motion of the haptic actuator; and applying an input end-of-braking gain to the driver input signal and a feedback end-of-braking gain to the BEMF voltage generated by the haptic actuator during the end-of-braking interval;

wherein the input end-of-braking gain is less than an input gain applied to the driver input signal prior to the end-of-braking interval and the feedback end-of-braking gain is less than a feedback gain applied to the BEMF voltage generated by the haptic actuator prior to the end-of-braking interval.

10. The method of claim 8, wherein the boost threshold scaling factor is a positive value less than one.

11. The method of claim 9, further comprising computing the end-of-braking threshold BEMF voltage value to be a product of:

a BEMF voltage value generated by the haptic actuator based on a full-scale actuator drive voltage; and an end-of-braking threshold scaling factor.

12. The method of claim 9, wherein the end-of-braking threshold scaling factor is a positive value less than one.

13. A tactile feedback system, comprising:

an actuator controller configured to control motion of a haptic actuator, the actuator controller comprising:

an input amplifier;

a feedback amplifier;

an actuator driver; and an amplifier gain controller coupled to, and configured to control gain of, the input amplifier and the feedback amplifier, the gain controller further configured to:

determine an end-of-braking interval for halting motion of the haptic actuator, the end-of-braking interval based on an end-of-braking threshold back-electromotive-force (BEMF) voltage value exceeding a BEMF voltage generated by the haptic actuator; and apply end-of-braking gains in the input amplifier and the feedback amplifier during the end-of-braking interval;

wherein the end-of-braking gains are lower than gains applied in the input amplifier and the feedback amplifier prior to the end-of-braking interval.

14. The system of claim 13, wherein the amplifier gain controller is configured to: determine a boost interval for initiating motion of the haptic actuator, the boost interval based on a boost threshold BEMF voltage value exceeding a BEMF voltage generated by the haptic actuator; and apply boost gains in the input amplifier and the feedback amplifier during the boost interval;

wherein the boost gains are higher than reduced gains applied in the input amplifier and the feedback amplifier after the boost interval.

15. The system of claim 14, wherein the amplifier gain controller is configured to apply the reduced gains in the input amplifier and the feedback amplifier based on the BEMF voltage generated by the haptic actuator being greater than the boost threshold BEMF voltage value.

16. The system of claim 15, wherein:

the boost threshold BEMF voltage value is a product of:

an input voltage value provided to the input amplifier, a BEMF voltage value generated by the haptic actuator based on a full-scale actuator drive voltage; and a boost threshold scaling factor; and the end-of-braking threshold BEMF voltage value is a product of:

the BEMF voltage value generated by the haptic actuator based on the full-scale actuator drive voltage; and an end-of-braking threshold scaling factor;

wherein the boost threshold scaling factor is greater than the end-of-braking threshold scaling factor.

17. The system of claim 16, wherein:

the boost threshold scaling factor and the end-of-braking threshold scaling factor are positive values less than one; and the boost gains are products of the reduced gains applied in the input amplifier and the feedback amplifier after the boost interval and a boost factor that is greater than one.

18. The system of claim 17, further comprising the haptic actuator, wherein the haptic actuator comprises one of an eccentric rotating mass actuator and a linear resonant actuator.

* * * * *